United States Patent [19]

Hempenius et al.

[11] 3,846,560

[45] Nov. 5, 1974

[54] PROCESS OF MAKING A BASE FOR PROTEIN BEVERAGES

[75] Inventors: Walter L. Hempenius, Maryland Heights; Joseph Valenti, St. Louis, both of Mo.; Robert E. Moser, Mentor, Ohio

[73] Assignee: Quaker Oats Company, Barrington, Ill.

[22] Filed: July 22, 1971

[21] Appl. No.: 165,338

[52] U.S. Cl. .................. 426/18, 426/44, 426/46, 426/190, 426/212, 426/477
[51] Int. Cl. ............................................... A23l 1/00
[58] Field of Search ........ 99/14, 17, 28, 79; 426/18, 426/44, 46

[56] References Cited
UNITED STATES PATENTS

| | | | |
|---|---|---|---|
| 1,237,723 | 8/1917 | Stein | 99/28 |
| 2,259,582 | 10/1941 | Perkey et al. | 99/17 |
| 3,640,725 | 2/1972 | Sherba et al. | 99/17 |
| 3,642,490 | 2/1972 | Hawley et al. | 99/17 |
| 3,645,745 | 2/1972 | Magnino et al. | 99/17 |
| 3,694,221 | 9/1972 | Hoer et al. | 99/17 |
| 3,713,843 | 1/1973 | Pour-el et al. | 99/79 |
| 3,733,207 | 5/1973 | McCabe | 99/17 |
| 3,741,771 | 6/1973 | Pour-el et al. | 99/79 |

OTHER PUBLICATIONS

Fujimaki, Applying Proteolytic Enzymes on Soybeans, Food Tech., Vol. 22, 7-1968, pp. 77-81.
Jacobs, Carbonated Beverages, 1959, pp. 13-15.

*Primary Examiner*—Morris O. Wolk
*Assistant Examiner*—Sidney Marantz

[57] ABSTRACT

An acidified protein beverage rich in nutritional polypeptide value is prepared by (1) forming a slurry of edible protein in water, (2) subjecting said slurry to a pre-hydrolysis, denaturation heat treatment, (3) subjecting said preheated slurry to the hydrolytic action of a proteolytic enzyme to produce water soluble polypeptides, (4) adjusting the pH of the solution to in the range of from about 2.5 to about 6.0 and (5) formulating the solubilized polypeptides into a beverage.

9 Claims, No Drawings

3,846,560

PROCESS OF MAKING A BASE FOR PROTEIN BEVERAGES

BACKGROUND OF THE INVENTION

1. Field of the Invention

This invention relates to a process for increasing yields of polypeptides and preparing an acidified beverage containing nutritional polypeptide. In a particular aspect this invention relates to a process for the preparation of an acidified beverage rich in solubilized polypeptide.

2. Description of Prior Art

The need for an economical source of protein which is easily prepared and which readily appeals to human taste is well known. Because of this need, protein containing beverages have been formulated using economical protein sources such as, for example, soya protein, casein and the like. A "neutral" beverage (one having a pH approximating neutrality) has been prepared simply by dissolving finely divided protein containing material, typically soya protein, in water and adding a suitable flavoring material. While such a beverage can be high in nutritional value, its taste and its general consistency, especially as it relates to mouth feel, does not give it the acceptability of acidified beverages generally and in particular, does not give it the acceptability of carbonated beverages.

It would seem that a neutral beverage containing protein in solubilized form could be easily converted to an acidified beverage simply by addition of suitable acid. However, such addition in the case of a protein beverage causes precipitation of a substantial portion of the protein. The precipitated material not only causes the beverage to appear cloudy but imparts a gritty mouth feel to the product and a bitter taste. Such a product has very little appeal even to the most unsophisticated consumer. The precipitated protein, of course, can be removed from the beverage, such as, by filtration, but such removal deprives the drinker of a substantial portion of the nutritional protein. In addition, even with removal of precipitated protein, the gritty mouth feel, bitter taste and generally poor consistency of the product remain.

SUMMARY OF THE INVENTION

It is an object of the present invention to provide a process for increasing the yield of a nutritional polypeptide product useful for incorporation in a food product.

It is a further object of the present invention to provide a process for flavor optimization of a nutritional polypeptide-containing food product, e.g., a carbonated beverage.

It is a further object of the present invention to provide a process for the preparation of an acidified protein-type beverage rich in a nutritional polypeptide product.

Other objects and advantages of the present invention will be apparent from the specification and appended claims.

The present invention resides in the discovery that a nutritional polypeptide product, derived from edible protein, can be produced in increased yields and, in another aspect, that an acidified beverage which is not only rich in such protein-type nutrition and substantially free of insoluble protein but has acceptable taste, mouth feel, and flavor optimizing qualities is obtained by subjecting an aqueous slurry of edible protein to a pre-hydrolysis, denaturation heat treatment, then to the hydrolytic action of a proteolytic enzyme to solubilize the protein, adjusting the pH of the thus treated aqueous dispersion to in the range of from about 2.5 to about 6.0, and subsequently formulating the solubilized protein into a beverage.

DETAILED DESCRIPTION

The process of the invention providing increased yields of polypeptides can use any suitable edible protein derived from oil seed. Such suitable protein materials include soya protein, for example, soya protein isolate, soya flour, soya grits, soya concentrate, and defatted soya meal; casein, cotton seed protein, corn seed protein, and their mixtures. Because of their low cost and ready adaptability to the process of the present invention, soya protein is generally used although defatted soya protein is preferred. It is also preferred that the protein material be ground, powdered, homogenized, comminuted or otherwise suitably converted to small particle size to permit easy and economical dispersion in water at the desired concentration of use.

In accordance with the process of the present invention, the pre-hydrolysis denaturation heat treatment is conducted by heating a slurry of edible protein, advantageously an aqueous slurry of defatted soya protein, under denaturation conditions including a temperature and residence time sufficient to substantially destroy vegetative cells but insufficient to substantially destroy spores. Generally, a temperature of at least about 150°F. for a time sufficient to increase the yield of a soluble, nutritional, polypeptide product, which is produced when the preheated product is subsequently subjected to enzymatic hydrolysis, can be used. The preheat is advantageously conducted in a heating zone under pressure conditions sufficient to maintain the integrity of the slurry, i.e., at a substantially constant volume.

The temperatures employed generally range from about 150°F. to 375°F., preferably from about 175° or 200° to 300°F., residence time employed can range from about 0.01 to 120 seconds, preferably from about 0.1 to 40 seconds; and pressure conditions depend upon the temperature employed and can range from atmospheric to super atmospheric conditions, e.g., from about 0 to 175 psig.

The concentration of the edible protein in the slurry is generally in amounts insufficient to deleteriously affect its processing since too high of a concentration will result in a viscous and difficult to handle slurry. Soya protein, for instance, has a tendency to absorb or tie-up water around its molecular structure and thus further thicken a slurry. Generally, when employing soya grits which normally contain about 50 wt. percent soya protein, the soya grits can be employed in the slurry in a concentration of up to about 16 wt. percent based upon the soya grits and water.

In a particularly advantageous aspect of the present invention, the pre-hydrolysis, denaturation heat treatment can be conducted using soya advantageously in flour or grit form containing between about 40 to 60 wt. percent protein under denaturation temperature and residence time conditions to provide a nutritional polypeptide product having optimized flavor characteristics as well as being produced in increased yields. In this aspect, the soya, preferably an aqueous slurry of defatted soya protein, is advantageoysly heated (a) at a temperature of at least about 200°F. and below a temperature which will deleteriously affect flavor optimization of the soluble polypeptide product produced by subsequent enzymatic hydrolysis, and (b) for a time sufficient to initiate some denaturation and insufficient to deleteriously affect the flavor optimization of the soluble polypeptide product produced by subsequent enzymatic hydrolysis. Generally, the temperatures can be range from about 200°F. to 265°F., preferably from about 215°F. to 245° or 255°F., and the residence time can range from about 0.1 to 30 seconds, preferably from about 0.2 to 20 seconds. At higher temperatures, shorter residence times can be used since the desired degree of denaturation can be effected more expeditiously while avoiding the risk of providing a nutritional polypeptide product which is bitter tasting.

In the enzymatic hydrolysis phase, the next phase of the process, any suitable proteolytic enzyme which serves to hydrolyze edible protein may be employed in the process of the present invention. Such proteolytic enzymes from animal, vegetable and microbiological sources are well known to the art and include, for example, protease enzymes such as neutral protease, alkaline protease and mixtures thereof, pepsin, ficin, papain, renin, etc. and the like. Because of its efficiency of operation and because of its maximum activity at neutral pH, neutral protease is the preferred enzyme for use in the process of the present invention.

Protease enzymes are typically obtained by cultivating a strain of a protease enzyme producing microorganism in a nutrient medium. Examples of such microorganisms used in preparation of protease enzymes include protease-enzyme producing microorganisms of the Bacillus, Aspergillus and Streptomyces genera such as, for example, *Bacillus subtilis*, *Aspergillus oryzae* and *Streptomyces griceus*. A particular strain of organisms used in the preparation of mixtures of neutral protease and alkaline protease is a mutant strain of Bacillus subtilis described in U.S. Pat. No. 3,031,380. A culture of this organism is deposited in the culture collection of the United States Department of Agriculture, Agricultural Research Service, Northern Utilization Division, Peoria, Illinois, and is available to the public. Most protease-enzyme producing microorganisms yield a mixture of neutral protease and alkaline protease. If desired, the enzyme of choice may be separated from the mixture by any suitable procedure such as, for example, by chromotography or ion exchange separation procedures.

In carrying out the process of the present invention the denatured edible protein enzymatic hydrolysis phase of the product from the preheat phase is employed; normally without further modification. However, the concentration of the denatured protein in the slurry may vary over a wide range and will depend, among other things, on the particular protein and the particular enzyme employed. A concentration of protein in the slurry of in the range of from about 1 to about 15 percent by weight based on the total weight of the slurry is generally suitable.

The pH of the slurry can be adjusted if necessary to the pH of maximum activity of the enzyme of choice. For example, when alkaline protease is the enzyme of choice, the pH of the slurry is adjusted upward from neutrality to about 10 using a suitable base, such as sodium hydroxide or potassium hydroxide. When pepsin is the enzyme of choice, the pH of the slurry will be adjusted downward from neutrality to about 2.0 with suitable acid, such as phosphoric acid or hydrochloric acid. When neutral protease is employed in the process of the present invention, no pH adjustment of the protein-containing slurry is required before addition of the enzyme. The amount of enzyme to be added to the slurry will vary, depending among other things, on the particular enzyme, including its activity, the pH of the slurry, the concentration of protein in the slurry and the source of the protein. Determination of a suitable amount of enzyme for use in this phase of the process is readily within the skill demanded of the art. The time required for enzyme treatment of the slurry will also vary depending principally upon the enzyme of choice, the temperature of the slurry and the amount and source of protein in the slurry. Typically, enzyme treatment time in the range of from about ½ to about 24 hours is employed. The temperature of treatment will also vary and will depend principally on the temperature at which the enzyme of choice has optimum activity. In the case of neutral protease, the preferred temperature is in the range of from about 105° to about 140°F. The optimum temperature for suitable enzymes other than neutral protease may be lower or higher and is readily determined by the skilled worker in the known manner. Generally speaking, a temperature in the range of from about 50° to about 160°F. is generally employed. Of course, elevated temperatures which tend to inactivate or denature the enzyme should be avoided.

In the particular aspect of the present invention which is concerned with flavor optimization of a nutritional polypeptide-containing beverage, the enzymatic hydrolysis is advantageously conducted at a temperature and residence time sufficient to hydrolyze a predominant amount of the pre-heated protein, for instance at least 65 wt. percent and preferably hydrolyze at least about 75 wt. percent of protein. The hydrolysis is, from a flavor optimization standpoint, preferably terminated before it proceeds to the point of produciug significant amount of product(s) with the desirable polypeptides which will cause a bitter taste in the mouth of one consuming a beverage containing such polypeptides. A low odor, bland polypeptide which can be incorporated into beverages is desirable. The hydrolyis is generally conducted to a point, however, to provide a soluble polypeptide product which will not precipitate at a pH below 4.5.

Advantageously, the enzymatic hydrolysis can be conducted at a temperature in the range of about 105°F. to 105°F., preferably 120°F. to 140°F., and a residence time generally from about 30 minutes (m.) to 150 m., preferably 90 m. to 120 m., particularly when using Montase 110 (DA-10) a commercial enzyme mixture described infra.

After treatment with enzyme, the pH of the slurry is adjusted to in the range of from about 2.5 to about 6.0, preferably 3.0 to about 4.0. When downward pH adjustment is required, as is the usual case, any acid suitable for food use may be employed. Such acids include phosphoric acid, malic acid, tartaric acid, citric acid, and succinic acid. When upward pH adjustment is required, a suitable base for food use such as sodium hydroxide or potassium hydroxide may be employed.

After pH adjustment, the solubilized polypeptide material may then be formulated into a beverage in the known manner, as for example, by addition to the dispersion of a flavor such as orange, cola, grape, vanilla, fruit or root beer; vitamins and minerals, coloring and preservative. If desired, the acidified beverage may also be carbonated. The beverage can be used immediately, or packaged as by bottling or canning for future use.

The invention will be understood more fully by reference to the following specific example. It is understood that the example is presented for the purpose of illustration only and is not intended as a limitation of the invention.

EXAMPLE

An aqueous slurry of soya grits, 30 kilograms having a soya grit concentration of 6.25 percent (16 kilograms) is prepared using Soyabits 20 AW, defatted soya grits, 55-70 percent WSP, (water soluble protein) containing 50 wt. percent protein and commercially available from Central Soya, a Chicago based company. 12 ppm of $F_2$ antifoam, a food grade silicone obtained from Hodag Chemical Corp., is added. The slurry is preheated at a temperature of 225°F. for 5 seconds by conducting it through a heat exchanger which contains a coil of tubing in a constant-temperature environment although other indirect heaters or direct steam injection can also be used to achieve the same conditions.

The preheated aqueous slurry is rapidly cooled to 130°F., and Montase 110, a commerical mixture of neutral protease, alkaline protease and amylase, is added. This enzyme mixture can be provided by fermentation with Bacillus subtilis strain NRRL-B-3411 and typically can contain (recovered solids) in the range of from about 700,000 to 2,000,000 units of neutral protease activity, about 200,000 to 500,000 units of alkaline protease activity, and about 300,000 to 500,000 units of amylase activity per gram. Montase 110 is added in powder form in an amount equivalent to one wt. percent of the amount of protein present in the slurry. The resulting mixture is stirred for approximately 105 minutes during which period the temperature is maintained at approximately 130°F. On completion of the 105-minute period, the temperature is lowered to 77°F., the pH of the slurry is lowered to 3.5 by addition of 85 percent aqueous phosphoric acid (277 grams). The acidified solution is allowed to settle overnight and an amount of solid material precipitates. Precipitated material is separated from the solution by centrifugation or decantation. A clear, acidified solution rich in nutritional polypeptides is obtained.

To formulate the acidified solubilized polypeptide into a beverage, a portion of the thus prepared material is mixed with 60 percent w/w (weight per weight) sucrose solution (720 grams), sodium benzoate (4.78 grams), lemon and lime oils (5.0 grams) FD and C yellow number 5 coloring (0.01 gram) and a mixture of vitamin A, B1, B2, B6, B12, D and niacin in a lactose carrier (1.2 grams). A resutling clear, pleasant tasting acidified beverage is then passed through a carbonator to give a protein beverage containing 2.5 volumes of carbon dioxide. The polypeptide-rich beverage is provided with a smooth consistency and on drinking gives no indication of a gritty, bitter or otherwise unpleasant mouth feel.

Various modfications and equivalents will be apparent to one skilled in the art and may be made in the process of the present invention without departing from the spirit or scope thereof and it is therefore to be understood that the invention is to be limited only by the scope of the appended claims.

We claim:

1. A process of making an acidic, aqueous solution of polypeptides for use as a base in preparing an acidic, protein beverage, comprising (a) heating an aqueous slurry of a defatted protein selected from the group consisting of soya, cotton or corn seeds at a temperature of from about 150° to 375°F. for a time sufficient to increase the yield of a soluble, nutritional, polypeptide product which is produced when the heated slurry is subsequently subjected to enzymatic hydrolysis, but insufficient to deleteriously affect the flavor of said polypeptide product, (b) subjecting the resulting slurry to enzymatic hydrolyis conditions including the action of a proteolytic enzyme to produce polypeptides, (c) adjusting the pH of the resulting slurry to within the range of from about 2.5 to 6.0, and (d) removing precipitated material from the slurry to leave a clear, acidic solution of polypeptides suitable for use as a base in preparing an acidic, protein beverage.

2. The process of claim 1 wherein the protein used is defatted soya protein.

3. The process of claim 1 wherein the aqueous slurry of defatted protein is heated for from about 0.01 to 120 seconds.

4. The process of claim 1 wherein the enzymatic hydrolyis conditions include a temperature of from about 105° to 150°F. and a residence time of about 30 to 150 minutes.

5. The process of claim 1 wherein the enzyme is a neutral protease.

6. A process of making an acidic, carbonated protein beverage from defatted soya protein, comprising heating an aqueous slurry of the defatted soya protein at a temperature of from about 150° to 375°F. for about 0.01 to 120 seconds, subjecting the resulting slurry to enzymatic hydrolyis conditions including the action of a proteolytic enzyme to produce polypepetides, adjusting the pH of the resulting slurry to within the range of from about 3.0 to 4.0, removing precipitated material from the acidified slurry to leave a clear, acidic solution of polypeptides, and formulating the solution into an acidic, carbonated beverage.

7. The process of claim 6 wherein the soya protein is in the form of soya flour or soya grits.

8. The process of claim 7 wherein the slurry is heated at a temperature of from about 200° to 265°F.

9. The process of claim 8 wherein the enzyme is neutral protease and the enzymatic hydrolyis conditions include a temperature of from about 105° to 150°F. and a residence time of from about 30 to 150 minutes.

* * * * *